(12) United States Patent
Motoe et al.

(10) Patent No.: US 7,871,214 B2
(45) Date of Patent: Jan. 18, 2011

(54) KEYBOARD UNIT AND ELECTRONIC APPARATUS HAVING A KEYBOARD UNIT

(75) Inventors: Hironori Motoe, Tokyo (JP); Ken Hatano, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 284 days.

(21) Appl. No.: 11/452,469

(22) Filed: Jun. 13, 2006

(65) Prior Publication Data

US 2007/0025792 A1 Feb. 1, 2007

(30) Foreign Application Priority Data

Jul. 26, 2005 (JP) ............................ P2005-216012

(51) Int. Cl.
*B41J 5/00* (2006.01)
*H01H 9/04* (2006.01)
*G06F 3/023* (2006.01)

(52) U.S. Cl. ...................... 400/472; 400/490; 400/496; 200/302.1; 200/302.2

(58) Field of Classification Search ................. 400/490, 400/472, 496; 341/20; 345/157; 200/302.1, 200/302.2
See application file for complete search history.

(56) References Cited

U.S. PATENT DOCUMENTS

| | | | |
|---|---|---|---|
| 5,624,117 A * | 4/1997 | Ohkubo et al. .......... 273/148 B |
| 5,793,605 A * | 8/1998 | Sellers ........................ 361/680 |
| 6,054,939 A * | 4/2000 | Wei et al. ....................... 341/20 |
| 6,252,184 B1 * | 6/2001 | Tsai et al. .................... 200/5 A |
| 6,633,986 B1 * | 10/2003 | Sellers ........................ 713/300 |
| 7,038,598 B2 * | 5/2006 | Uke ............................. 341/20 |

FOREIGN PATENT DOCUMENTS

| | | | |
|---|---|---|---|
| JP | 64-38670 | | 3/1989 |
| JP | 06-307968 | * | 4/1994 |
| JP | 08-254953 | | 10/1996 |
| JP | 10-254360 | | 9/1998 |
| JP | 2379973 Y | | 5/2000 |

OTHER PUBLICATIONS

Japanese Office Action dated Feb. 5, 2008 for application No. 2005-216012 (U.S. Appl. No. 11/452,469), entitled Information Processing Apparatus. (English Translation).
Chinese Office Action dated Jul. 25, 2008 for application No. 2006-101090674 (U.S. Appl. No. 11/452,469), entitled Keyboard Unit and Electronic Apparatus Having a Keyboard Unit. (English Translation).

* cited by examiner

*Primary Examiner*—Daniel J Colilla
*Assistant Examiner*—Marissa L Ferguson-Samreth
(74) *Attorney, Agent, or Firm*—Blakely, Sokoloff, Taylor & Zafman LLP

(57) ABSTRACT

According to one embodiment, a keyboard unit that includes a keyboard body having a key top and a detecting unit detecting water. The detecting unit is positioned on the keyboard body so as to facing to an under side of the key top.

25 Claims, 8 Drawing Sheets

KEYBOARD UNIT AND ELECTRONIC APPARATUS HAVING A KEYBOARD UNIT

CROSS-REFERENCE TO RELATED APPLICATIONS

This application is based upon and claims the benefit of priority from Japanese Patent Application No. 2005-216012, filed Jul. 26, 2006, the entire contents of which are incorporated herein by reference.

BACKGROUND

1. Field

One embodiment of the invention relates to a keyboard unit and an electronic apparatus having a keyboard unit.

2. Description of the Related Art

A cell phone is known for which a user can check whether the cause of its failure is immersion in water. This cell phone includes a case, a circuit board which is accommodated in the case, keys which project through cuts of the case, and immersion labels for detecting water. The keys are elastic and assume a dome shape, and are fixed to the circuit board. The immersion labels are disposed between portions for fixing keys to the circuit board. Water-soluble ink is printed on the immersion labels. When an immersion label is exposed to water, the water-soluble ink blurs on the surface of the immersion label, which allows a user to recognize that the cell phone was immersed in water. It is disclosed by, for example, Japanese Patent Application Publication (KOKAI) No. 10-254360.

Incidentally, keyboards provided in electronic apparatus such as portable computers employ keys that are different in structure from the keys of cell phones. That is, the keys of cell phones have a key top and a supporting unit that supports the key top in such a manner that the key top can move upward and downward. Desired information can be input to a portable computer by depressing key tops.

If the immersion label employed in the above conventional cell phone is applied to an electronic apparatus, water is detected when a considerable amount of water has entered the keyboard or the case. Water may not be detected when only a small amount water has entered it. Therefore, when, for example, an electronic apparatus or a keyboard has failed, it is difficult to judge whether or not the cause of the failure is immersion in water.

One embodiment of the invention provides a keyboard and an electronic apparatus capable of detecting water easily.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a keyboard unit that includes a keyboard body having a key top and a detecting unit detecting water. The detecting unit is positioned on the keyboard body so as to facing to an under side of the key top.

An electronic apparatus according to a first embodiment of the present invention will be hereinafter described with reference to FIGS. 1 to 8.

Figure 1:
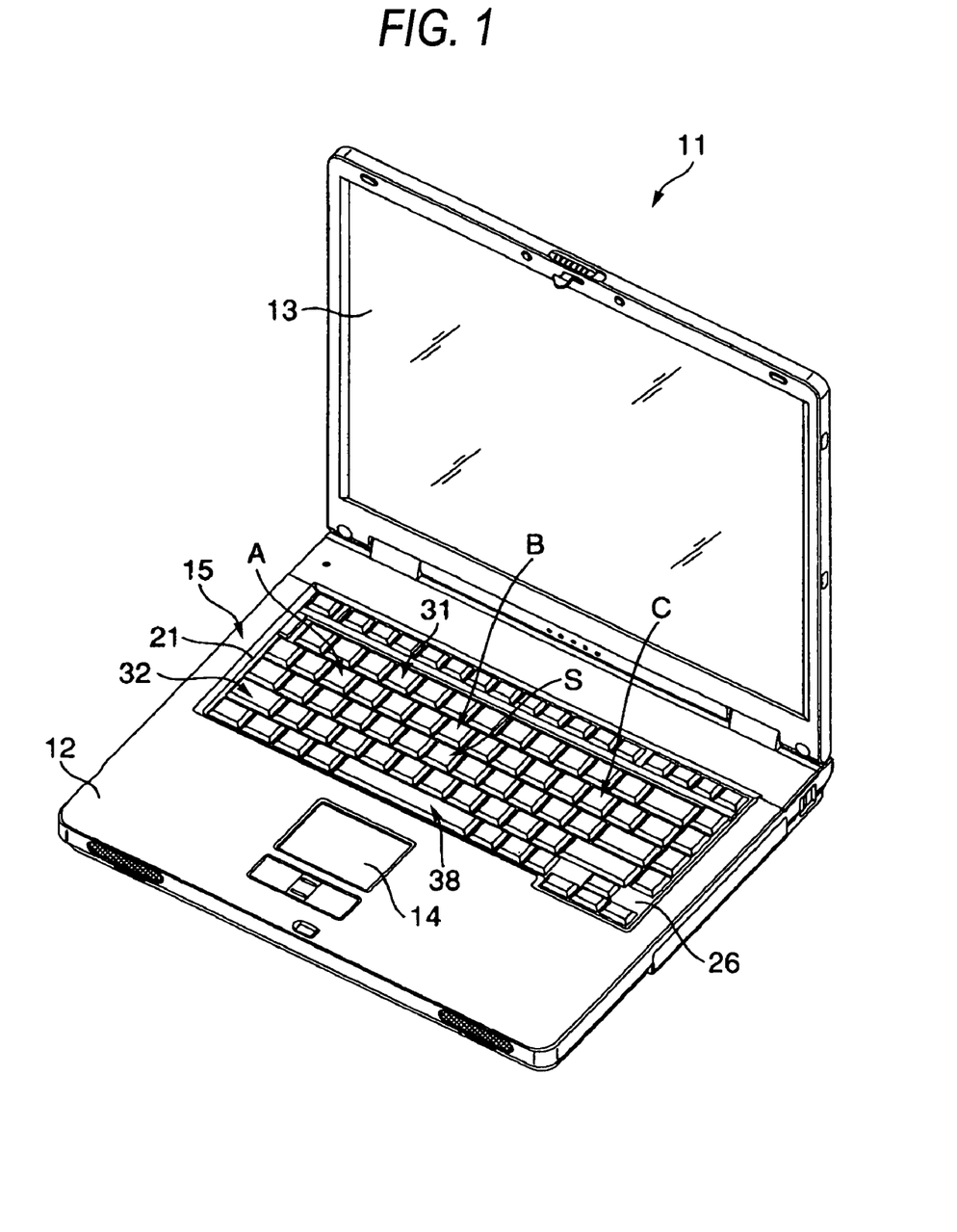
FIG. 1 is an exemplary perspective view of a portable computer according to an first embodiment of the invention.
Figure 7:
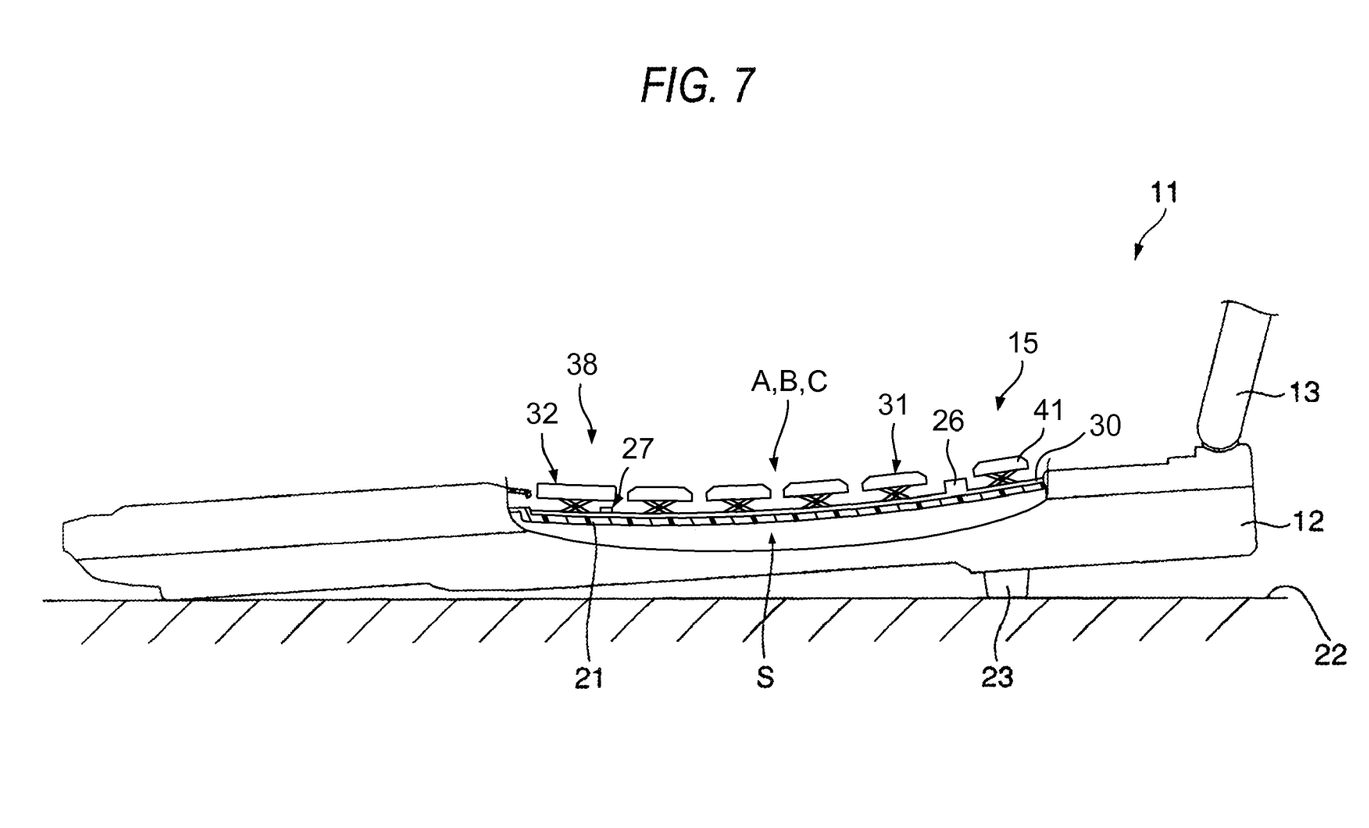
FIG. 7 is an exemplary partially cutaway side view of the portable computer according to the first embodiment.

According to an embodiment, FIG. 1 shows a portable computer 11 as an exemplary electronic apparatus has a case 12, a display 13, a touch panel 14, and a keyboard unit 15. The case 12 has a keyboard support 21 on its top. As shown in FIG. 7, the keyboard support 21 is a recess or opening that is open upward and it supports the keyboard unit 15.

As shown in FIG. 7, the bottom surface of the case 12 is formed with legs 23. When the portable computer 11 is placed on a top plate 22 of a desk, for example, the legs 23 are brought in contact with the top plate 22. As a result, the keyboard unit 15 assumes such a posture that its side closer to a user is lower, which enhances the ease of operation of the keyboard unit 15.

Figure 2:
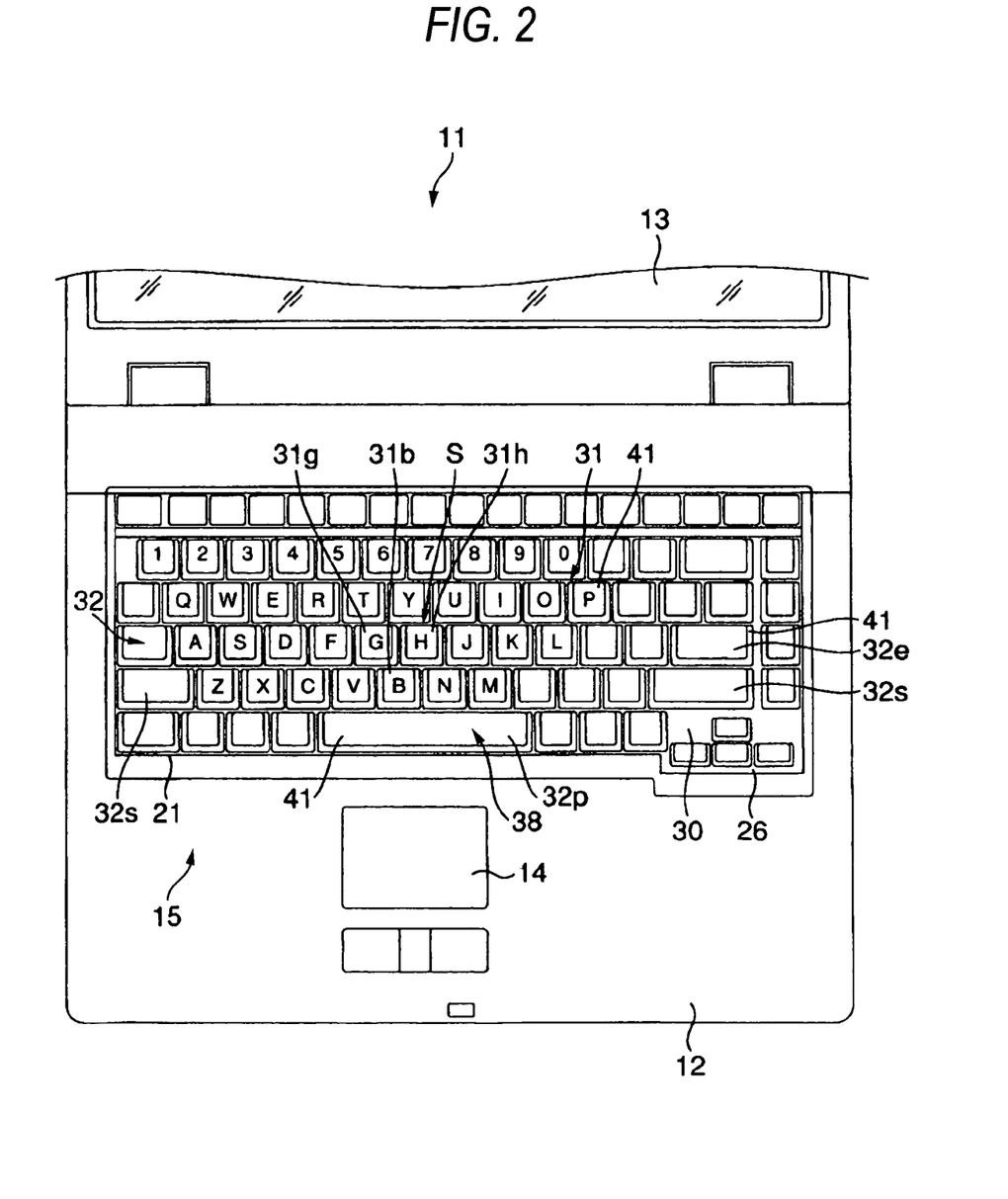
FIG. 2 is an exemplary top view of a keyboard unit provided in the portable computer according to the first embodiment.
Figure 3:
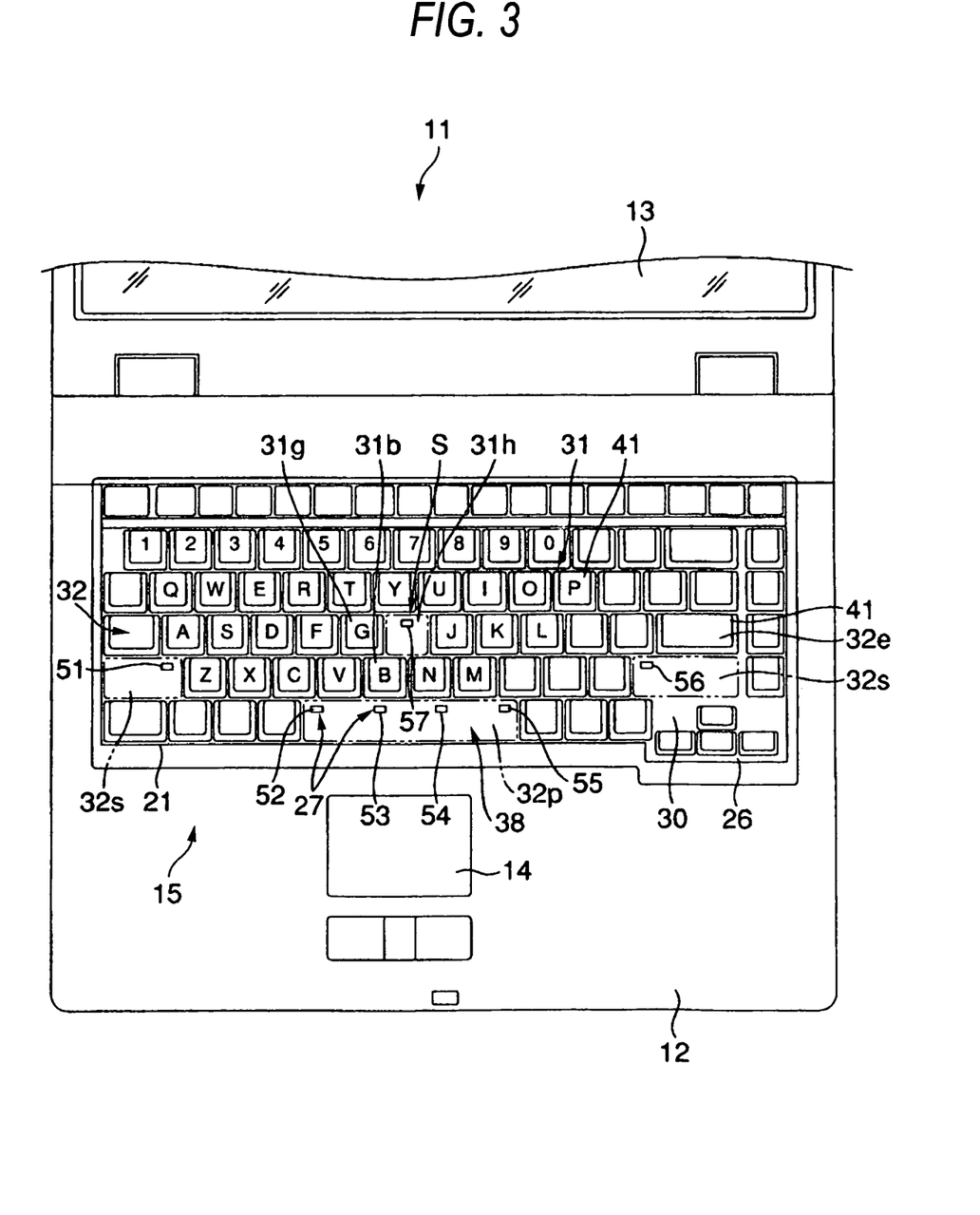
FIG. 3 is an exemplary top view of the keyboard unit in a state that part of keys are removed according to the first embodiment.

As shown in FIGS. 2 and 3, the keyboard unit 15 has a common key arrangement. The keyboard unit 15 has a keyboard body 26 and a detecting unit 27.

Figure 4:
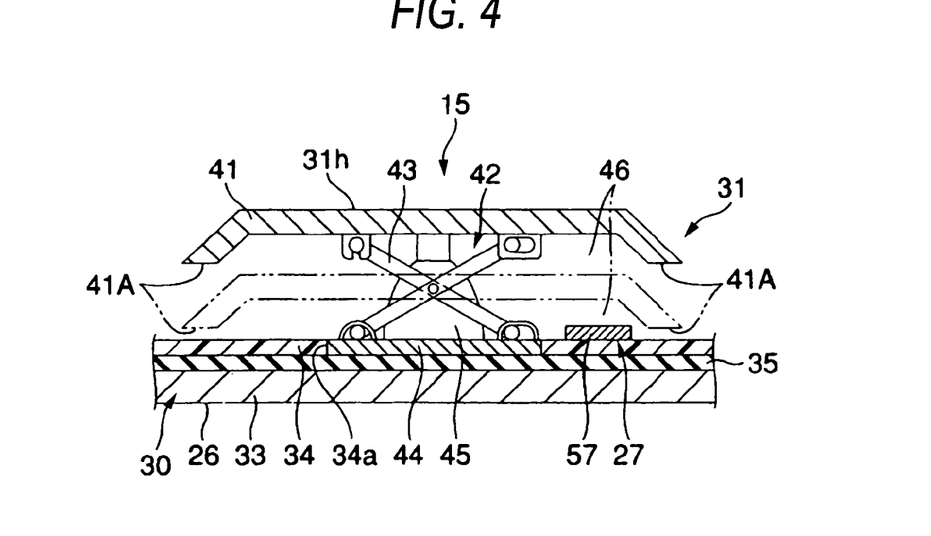
FIG. 4 is an exemplary sectional view of an "H" key according to the first embodiment.

The keyboard body 26 includes a base 30, a character key group 31 having plural character keys, a function key group 32 having other keys that are larger than the character keys in the area of a key top 41. The base 30 assumes a plate shape of such a size as to fit in the keyboard support 21 of the case 12 tightly. As shown in FIG. 4, the base 30 is provided with a metal reinforcement plate 33, a flexible cover 34 which covers the surface of there in for cement plate 33, and a film-like circuit board 35. A peripheral portion of the base 30 is curved so that a central portion S becomes slightly lower. With this measure, when the base 30 is fixed to the keyboard support 21, the central portion S of the keyboard body 26 is prevented from rising even if the base 30 is screwed at the four corners.

As shown in FIG. 2, the character key group 31 is placed on the top surface of the base 30 so as to occupy a central portion. The function key group 32 is placed on the top surface of the base 30 around the character key group 31. The character key group 31 includes keys corresponding to the alphabetical letters "A" to "Z" and numerals "1" to "0," respectively. The character key group 31 includes a "B" key 31b, an "H" key 31h, and a "G" key 31g, for example. The "B" key 31b, the "H" key 31h, and the "G" key 31g are provided in the central portion S of the keyboard body 26.

The function key group 32 includes a space key 32p, an enter key 32e, and shift keys 32s. The space key 32p is provided in the central portion S of the keyboard body 26 at a position 38 that is closer to a user. The shift keys 32s are located on both sides of the space key 32p in the width direction of the keyboard body 26.

As shown in FIG. 4, each of the keys of the character key group 31 and the function key group 32 has a flat, trapezoidal key top 41 and a support mechanism 42 for supporting the key top 41 in such a manner that the key top 41 can move upward and downward. The support mechanism 42 includes links 43, a link receiver 44, and an elastic member 45. For example, the link receiver 44 is attached directly to the reinforcement plate 33. The links 43 are interposed between the link receiver 44 and the key top 41 so as to be able to expand and contract and thereby support the key top 41 from below. The elastic member 45 urges the key top 41 upward. The cover 34 of the base 30 has a rectangular cut 34a at a position corresponding to the link receiver 44.

The key top 41 has a flange 41A which extends obliquely downward. When a user depresses the key top 41 with a finger, the key top 41 goes down to a depression position that is indicated by a two-dot chain line in FIG. 4. When the user releases the finger from the key top 41, the key top 41 is lifted up by the elastic member 45 to a standby position that is indicated by a solid line in FIG. 4.

As shown in FIG. 2, the key top 41 of each key of the character key group 31 has a square shape. The key top 41 of the space key 32p has a rectangular shape that is four to five times longer in width dimension than each key of the character key group 31. The key top 41 of each shift key 32s has a rectangular shape that is two times longer in width dimension than each key of the character key group 31. Therefore, the key tops 41 of the space key 32p and the shift keys 32s are larger in area than the character keys.

As shown in FIG. 3, the detecting unit 27 is disposed at the position 38 that is closer to a user. The detecting unit 27 has first to seventh detection elements 51 to 57. For example, the first detection element 51 is fixed under the key top 41 of the left shift key 32s. For example, the second to fifth detection elements 52 to 55 are fixed under the key top 41 of the space key 32p. For example, the sixth detection element 56 is fixed under the key top 41 of the right shift key 32s. For example, the seventh detection element 57 is fixed under the key top 41 of the "H" key 31h.

Each of the first detection element 51 and the sixth detection element 56 is located at a central-portion-S-side position in the region of the corresponding shift key 32s. The detection elements 51 to 56 of the detecting unit 27 are arranged in the width direction of the keyboard unit 15 so as to be spaced from each other. The positions of the detection elements 51 to 56 are not limited to the positions under the key tops 41 of the space key 32p and the shift keys 32s and maybe any positions as long as they are under the key tops 41 of rectangular keys such as the enter key 32e.

For example, each of the detection elements 51 to 57 of the detecting unit 27 is a sheet to whose surface water-soluble ink is applied. When each of the detection elements 51 to 57 is exposed to a liquid, the water-soluble ink blurs on the sheet surface and the appearance of the detection element varies. Whether or not immersion has occurred can be detected on the basis of whether the appearances of the detection elements 51 to 57 have varied. Although in this embodiment the detection elements 51 to 57 of the detecting unit 27 are the above-mentioned sheets, they may be sensors capable of detecting a liquid instead of the sheets.

Figure 5:
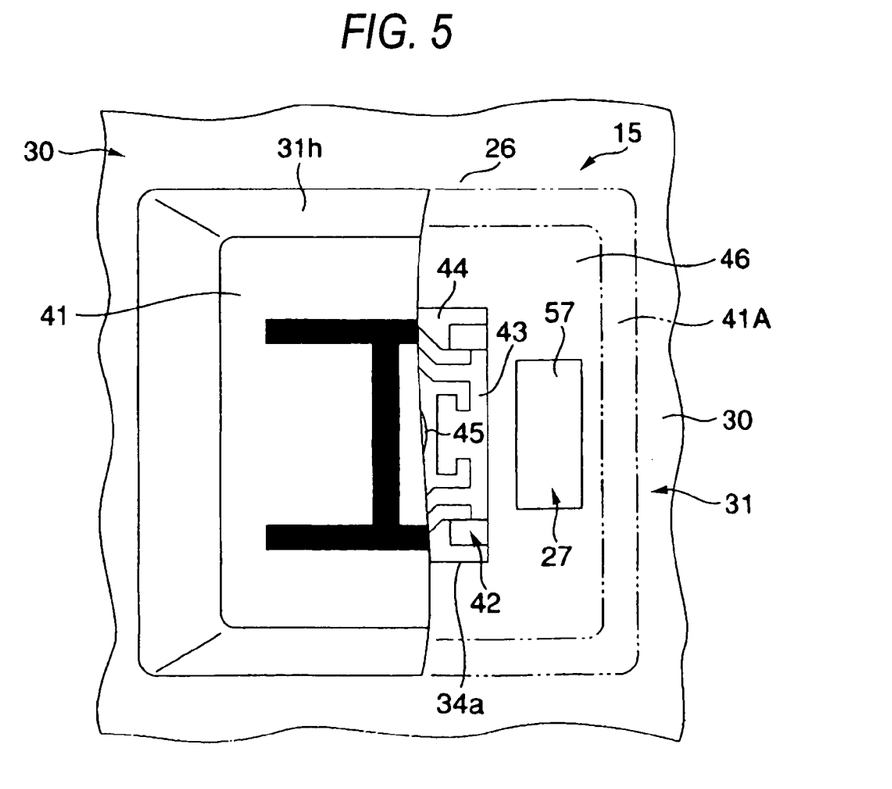
FIG. 5 is an exemplary partially cutaway top view of the "H" key according to the first embodiment.

A positional relationship between each of the detection elements 51 to 57 and the associated key will be described below with reference to FIGS. 4 and 5, using the seventh detection element 57 and the "H" key 31h as an example. The seventh detection element 57 is stuck to the top surface of the cover 34. The seventh detection element 57 is positioned on the keyboard body so as to facing to an under side of the key top 41 in a region 46 that is enclosed by the flange 41A of the key top 41. Therefore, when the key top 41 is lowered, the interference between the flange 41A and the detection element 57 can be prevented. The seventh detection element 57 is located at a rear position in the region 46 enclosed by the flange 41A of the key top 41.

Likewise, each of the first to sixth detection elements 51 to 56 is positioned on the keyboard body so as to facing to an under side of the key top 41 in a region 46 enclosed by the flange 41A of the key top 41 and is stuck to the top surface of the cover 34. Therefore, each of the first to sixth detection elements 51 to 56 is prevented from interfering with the flange 41A of the key top 41. As shown in FIGS. 3, 4, and 5, each of the second to fifth detection elements 52 to 55 is located at a rear position in the region 46 enclosed by the flange 41A of the key top 41. Further, each of the first and sixth detection elements 51 and 56 is located at a rear, central-portion-S-side position in the region 46 enclosed by the flange 41A of the key top 41. Although in this embodiment the seventh detection element 57 is positioned on the keyboard body so as to facing to an under side of the key top 41 of the "H" key 31h, it may be positioned on the keyboard body so as to facing to an under side of the key top 41 of any of the "B" key 31b, the "G" key 31g, and the space key 32p which are located in the central portion S of the keyboard unit 15.

Now, a detailed structure of the keys will be described with reference to FIG. 6, using the "H" key 31h as an example. The circuit board 35 is provided with a board main body 36 made of an insulator and a pair of interconnections 37 that are formed on the board main body 36 in a prescribed pattern. The elastic member 45 has a cylindrical shaft 47 and a semicircular dome 48 for supporting the shaft 47. The bottom end of the shaft 47 is provided with a connection portion 47a made of a conductive material.

Figure 6:
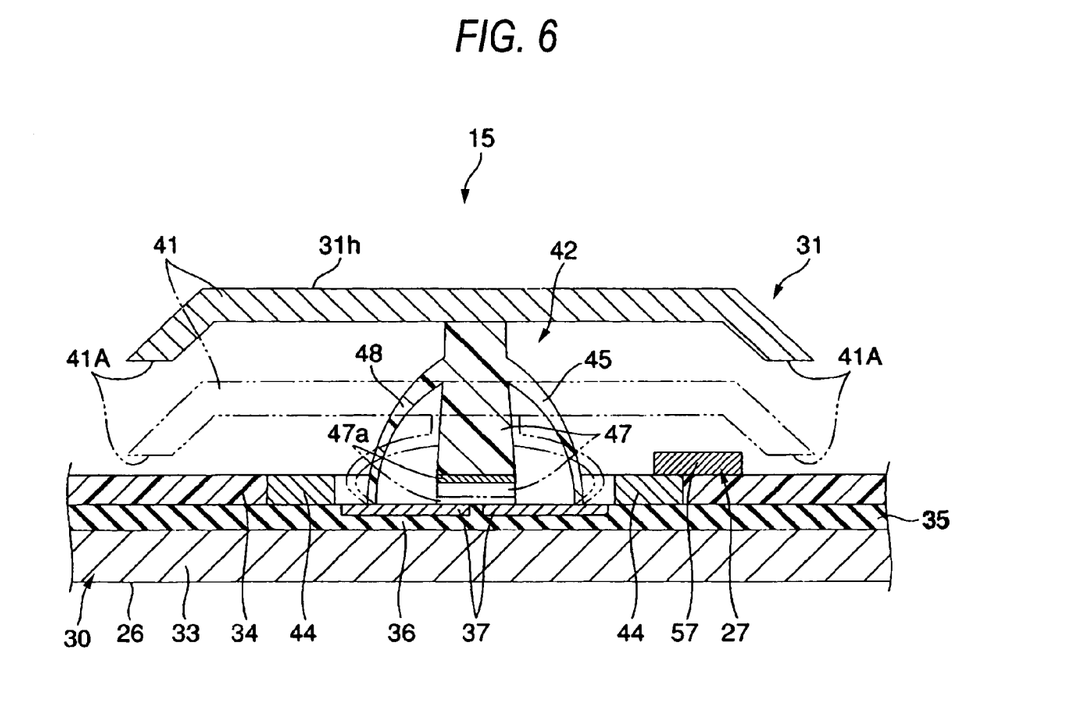
FIG. 6 is an exemplary enlarged version of the sectional view of the "H" key according to the first embodiment.

When a user depresses the key top 41 with a finger, the elastic member 45 is deformed as indicated by two-dot chain lines in FIG. 6. As a result, the connection portion 47a is brought into contact with both interconnections 37 to establish a conduction state, whereupon character information "H" is input to the portable computer 11.

Figure 8:
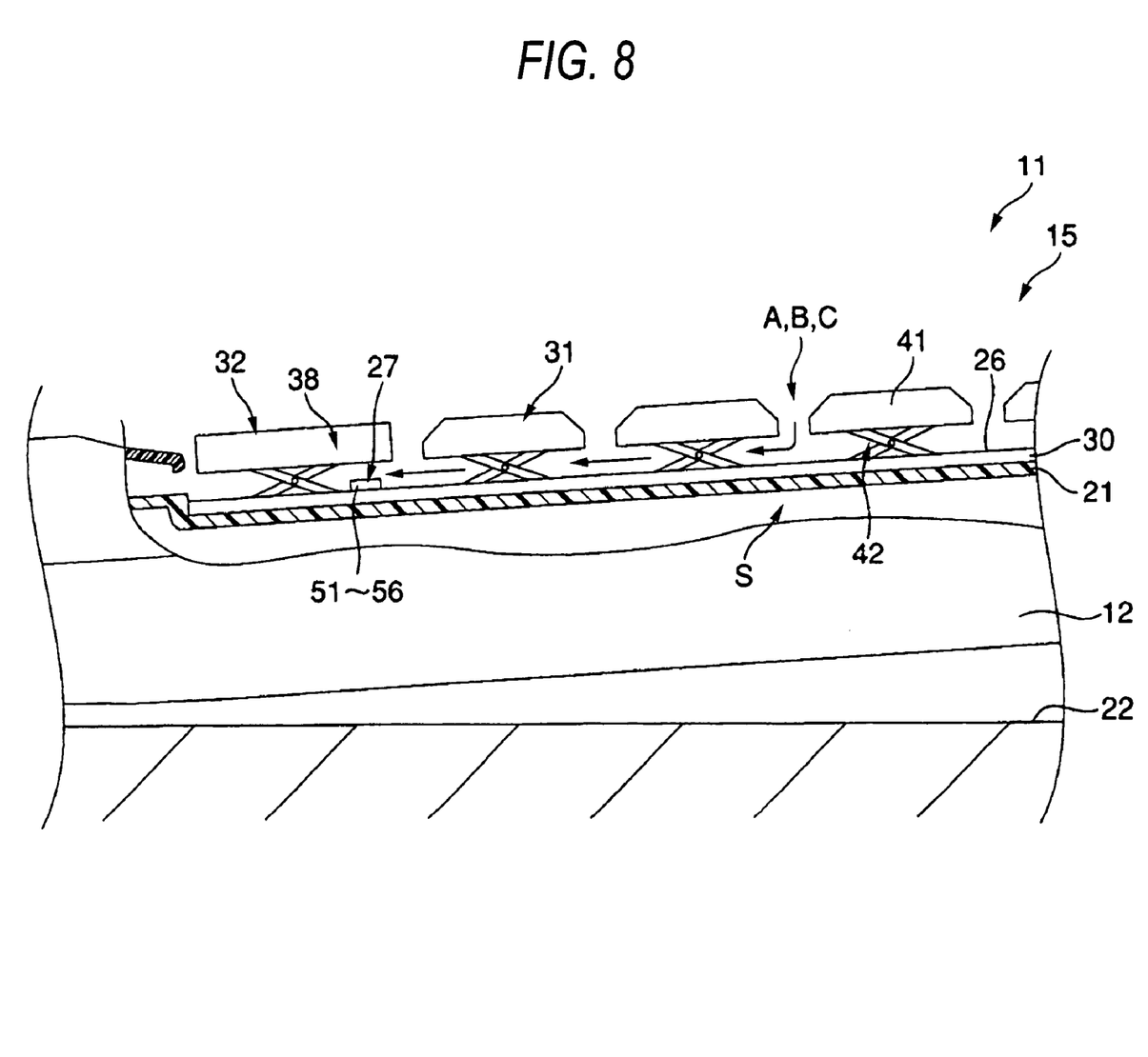
FIG. 8 is an exemplary enlarged version of the side view of a neighborhood of a keyboard of the portable computer according to the first embodiment.

Next, referring to FIGS. 1, 7, and 8, a description will be made of how the detecting unit 27 operates when a liquid such as a drink splashes onto the keyboard unit 15.

For example, assume that a liquid has splashed onto the keyboard unit 15 from position A in FIGS. 1 and 7. As shown in FIG. 8, the liquid flows on the base 30 from a rear position toward the position 38 that is closer to a user because the base 30 is inclined. During that course, the liquid changes the color of the first and second detection elements 51 and 52 which are located on the left side in the key board unit 15. In this manner, the fact that immersion in water has occurred from around position A can be detected.

Assume that a liquid has splashed onto the keyboard unit 15 from position B in FIGS. 1 and 7. As shown in FIG. 8, the liquid flows on the base 30 from a rear position toward the position 38 that is closer to a user. The liquid changes the color of the second to fifth detection elements 52 to 55 and the seventh detection element 57 which are located around the center of the keyboard unit 15. In this manner, the fact that immersion in water has occurred in this portion can be detected.

Likewise, assume that a liquid has splashed on to the keyboard unit 15 from position C in FIGS. 1 and 7. As shown in FIG. 8, the liquid flows on the base 30 from a rear position toward the position 38 that is closer to a user. The liquid changes the color of the fifth and sixth detection elements 55 and 56 which are located on the right side in the keyboard unit 15. In this manner, the fact that immersion in water has occurred in this portion can be detected.

Further, assume that only a small amount of liquid has splashed onto the keyboard unit 15 from position A, B, or C in FIG. 1. In this case, since as mentioned above, the central portion S of the base 30 is slightly lower, the small amount of liquid gathers in the central portion S. Therefore, the liquid changes the color of the seventh detection element 57 shown in FIG. 3, whereby immersion in a small amount of water can be detected.

The portable computer 11 according to the first embodiment has been described above. According to the first embodiment, each of the detection elements 51 to 57 of the detecting unit is positioned on the keyboard body so as to facing to an under side of the key top 41 in the region 46 enclosed by the flange 41A of the key top 41. Therefore, the fact that immersion in water has occurred in the keyboard unit 15 can be detected quickly. Further, the interference between the flange 41A of the key top 41 and the detecting unit 27 can be prevented, which enhances the ease of operation of the keyboard unit 15. In addition, the detection elements 51 to 57 of the detecting unit 27 do not project from the key tops 41 and hence do not spoil the appearance of the keyboard unit 15.

The seventh detection element 57 of the detecting unit 27 is positioned on the keyboard body so as to facing to an under side of the key top 41 of the "H" key 31h which is located in the central portion S. Therefore, the fact that immersion in water has occurred can be detected even in the case where the amount of liquid that has caused the immersion is small and the liquid gathers in the central portion S of the base 30. The detection elements 51 to 56 of the detecting unit 27 are arranged in the width direction of the keyboard unit 15 so as to be spaced from each other. Therefore, water can be detected wherever in the keyboard body 26 it starts.

The first to sixth detection elements 51 to 56 of the detecting unit 27 are positioned on the keyboard body so as to facing to an under side of the key tops 41 of the space key 32p and the shift keys 32s whose key tops 41 are larger in area than the key tops 41 of the keys of the character key group 31. This prevents the detection elements 51 to 56 of the detecting unit 27 from sticking out from the flanges 41A of the key tops 41 even in the case where the detection elements 51 to 56 of the detecting unit 27 occupy wide areas. Each of the first detection element 51 and the sixth detection element 56 of the detecting unit 27 is located at a central-portion-S-side position in the region of the corresponding shift key 32s. Therefore, the fact that immersion in water has occurred can be detected even if the liquid that has caused the immersion has gathers in the central portion S of the base 30. Further, the keyboard body 26 is inclined in such a manner that the height decreases as the position goes closer to a user, and the detection elements 51 to 56 of the detecting unit 27 are positioned on the keyboard body so as to facing to an under side of the key tops 41 of the space key 32p and the shift keys 32s which are located at the position 38 that is closer to a user. Therefore, a liquid that has caused immersion in water can be guided on the keyboard body 26 toward the side closer to the user and can be detected reliably by the detecting unit 27.

The first to seventh detection elements 51 to 57 of the detecting unit 27 are sheets whose appearance varies when the detection elements 51 to 57 are exposed to a liquid. Therefore, the detecting unit 27 can be implemented simply at a low cost. Further, constructing the portable computer 11 in the above-described manner makes it possible to find the cause of a failure quickly and repair the portable computer 11 quickly.

Figure 9:
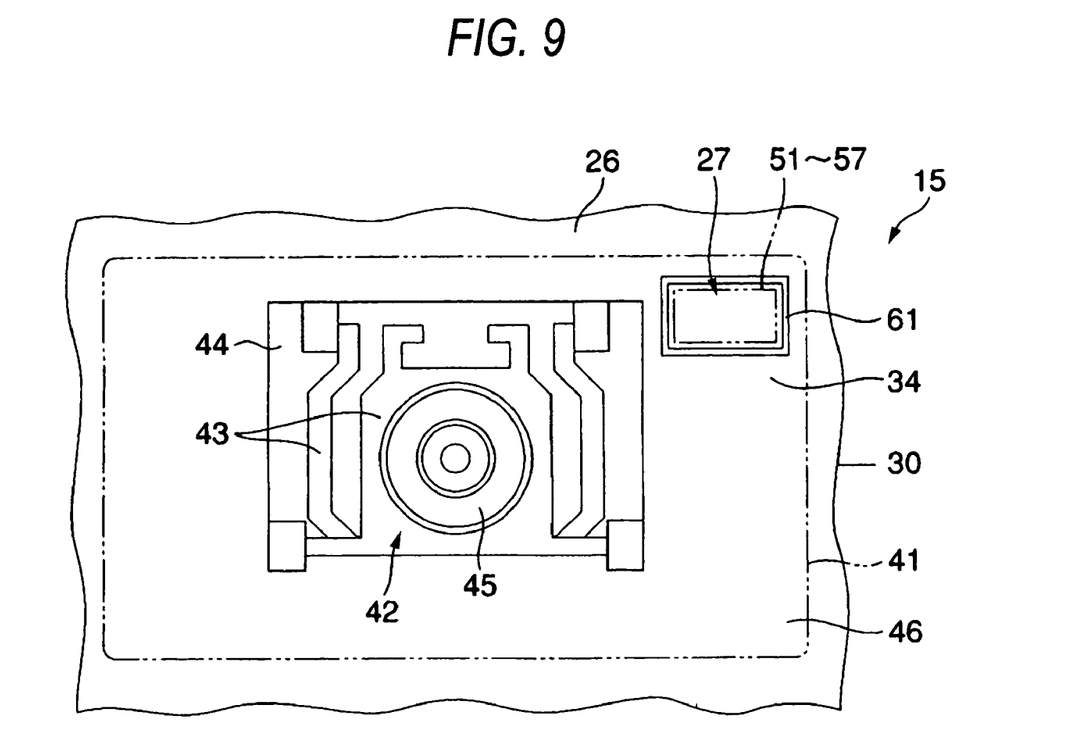
FIG. 9 is an exemplary top view of a keyboard unit according to a second embodiment of the invention.

An electronic apparatus according to a second embodiment of the invention will be described with reference to FIG. 9. A portable computer 11 according to the second embodiment is the same in configuration as the portable computer 11 according to the first embodiment except for the cover 34 of the base 30. Therefore, components having the same components in the first embodiment are given the same reference symbols as the latter and will not be described.

In the second embodiment, marks 61 indicating attachment positions of the detection elements 51 to 57 of the detecting unit 27 are provided on the cover 34 of the keyboard body 26. For example, the marks 61 are printed in a rectangular shape.

According to the second embodiment, the detection elements 51 to 57 of the detecting unit 27 can be fixed easily using the marks 61 as guides.

Keyboard units according to the invention can be used in not only portable computers as described in the embodiments but also other electronic apparatus such as desktop personal computers. Further, the detecting unit 27 may be provided on not only the keyboard unit 15 but also other structures and circuit boards such as the touch panel 14.

While certain embodiments of the inventions have been described, these embodiments have been presented by way of example only, and are not intended to limit the scope of the inventions. Indeed, the novel methods and systems described herein maybe embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A keyboard unit comprising:
   a keyboard body that includes:
   a base that is shaped in a plate-like shape,
   a support unit that is disposed on the base and that is moveable upward and downward, and
   a plurality of keys including a plurality of character keys being disposed in a central portion and a plurality of function keys being disposed in a peripheral portion outward the central portion, each of the plurality of keys including a key top, the key top being disposed on the support unit; and
   a detecting unit that detects exposure to a liquid and that is disposed on the base so as to face an under side of the key top, the detecting unit being a plurality of water immersion detection sheets that are formed to change appearance upon contact with the liquid, wherein a number of water immersion detection sheets provided under the plurality of function keys is greater than a number of water immersion detection sheets provided under the plurality of character keys,
   wherein the base is inclined so that a rear portion of the base is higher than a front portion of the base and a peripheral portion of the base is curved so that a central portion of the base is slightly lower than the peripheral portion, and
   wherein the detecting unit is located on a rear portion in a space on the base covered by the key top.

2. The keyboard unit according to claim 1, wherein the detecting unit is positioned on the keyboard body so as to face to an under side of a key top, which is located in a central portion of the keyboard body.

3. The keyboard unit according to claim 2, wherein the key top located in the central portion corresponds to one of a "space" key, a "B" key, a "G" key, and an "H" key.

4. The keyboard unit according to claim 1, wherein
the key top corresponds to a character key or another key, a key top of which is larger in area than a key top of the character key, and
the detecting unit is positioned on the keyboard body so as to face to an under side of the key top of the other key.

5. The keyboard unit according to claim 1, wherein
the detecting unit is located at the rear portion of the space on the base that is closer to a center of the keyboard body, and is in the region enclosed by the flange of the key top.

6. The keyboard unit according to claim 1, wherein
a mark indicating an attachment position of the sheet is provided on the keyboard body.

7. The keyboard unit according to claim 6, wherein
the keyboard body has a metal reinforcement plate, a flexible cover, and a film-like circuit board which is interposed between the reinforcement plate and the cover, and the sheet is stuck to the cover.

8. An electronic apparatus comprising:
a case having a key board support; and
a keyboard unit supported by the key board support, wherein the keyboard unit includes:
a keyboard body having a base and a plurality of keys including a plurality of character keys being disposed in a central portion and a plurality of function keys being disposed in a peripheral portion outward the central portion, each of the plurality of keys including a key top, and
a detecting unit detecting a liquid and positioned on the keyboard body so as to face an under side of the key top, the detecting unit including a plurality of water immersion detection sheets that are formed to change appearance upon contact with the liquid, wherein a number of water immersion detection sheets provided under the plurality of function keys is greater than a number of water immersion detection sheets provided under the plurality of character keys,
wherein the base is inclined so that a rear portion of the base is higher than a front portion of the base and a peripheral portion of the base is curved so that a central portion of the base is slightly lower than the peripheral portion, and
wherein the detecting unit is located on a rear portion in a space on the base covered by the key top.

9. The electronic apparatus according to claim 8, wherein
the detecting unit is positioned on the keyboard body so as to face to an under side of a key top, which is located in a central portion of the keyboard body.

10. The electronic apparatus according to claim 9, wherein
the key top located in the central portion corresponds to one of a "space" key, a "B" key, a "G" key, and an "H" key.

11. The electronic apparatus according to claim 8, wherein
the key top corresponds to a character key or an other key, a key top of which is larger in area than a key top of the character key; and
the detecting unit is positioned on the keyboard body so as to face to an under side of the key top of the other key.

12. The electronic apparatus according to claim 8, wherein
the detecting unit is located at the rear portion of the space on the base that is closer to a center of the keyboard body, and is in the region enclosed by the flange of the key top.

13. The electronic apparatus according to claim 8, wherein
the detecting unit is a sheet, an appearance of which varies when the sheet is exposed to a liquid.

14. The electronic apparatus according to claim 13, wherein
a mark indicating an attachment position of the sheet is provided on the keyboard body.

15. The electronic apparatus according to claim 14, wherein
the keyboard body has a metal reinforcement plate, a flexible cover, and a film-like circuit board which is interposed between the reinforcement plate and the cover, and the sheet is stuck to the cover.

16. An electronic apparatus comprising:
a keyboard support;
a keyboard unit supported by the keyboard support, the keyboard unit includes a keyboard body having a base and a plurality of keys each having a key top, the base of the keyboard unit being sized to fit within the keyboard support and a peripheral portion of the base is curved so that a central portion of the base is slightly lower than the peripheral portion, the plurality of keys including a plurality of character keys being disposed in the central portion and a plurality of function keys being disposed in the peripheral portion outward the central portion; and
a plurality of detecting elements positioned on the base and each facing an underside of the key top, each of the plurality of detecting elements being a water immersion detection sheet that is formed to change appearance upon contact with a liquid, wherein a number of water immersion detection sheets provided under the plurality of function keys is greater than a number of water immersion detection sheets provided under the plurality of character keys.

17. The electronic apparatus of claim 16, wherein the detecting unit is a sheet having a water-soluble ink so that the appearance of the sheet varies when the sheet is exposed to the liquid.

18. The electronic apparatus of claim 16, wherein a first detecting unit of the plurality of detecting elements is located at a rear portion of a space positioned under a first key top of the plurality of key tops that is closer to a center of the keyboard body than a center of the rear portion of the space.

19. A keyboard unit comprising:
a keyboard body including a plurality of keys each having a key top, the plurality of keys having a base and including a plurality of character keys being disposed in a central portion and a plurality of function keys being disposed in a peripheral portion outward the central portion; and
a water immersion detector is disposed on the base so as to face an underside of the keytop, the water immersion detector being a plurality of water immersion detection sheets that are formed to change appearance upon contact with the liquid, wherein a number of water immersion detection sheets provided under the plurality of function keys is greater than a number of water immersion detection sheets provided under the plurality of character keys.

20. The keyboard unit according to claim 19,
wherein water immersion detector provided under at least one of the function keys at a region enclosed by an edge of the corresponding key top.

21. The keyboard unit according to claim 19,
wherein the keyboard unit is mounted on an upper surface of a device for a desktop usage.

22. The keyboard unit according to claim 21,
wherein water immersion detector is provided under the corresponding key so as to not interfere with the corresponding key top when the corresponding key is pushed down.

23. The keyboard unit according to claim 21,
wherein water immersion detector is provided under the corresponding key so as to be covered by the corresponding key top as viewed from above.

24. An electronic apparatus comprising:
a keyboard support;
a keyboard unit supported by the keyboard support, the keyboard unit includes a keyboard body having a base and a plurality of keys each having a key top, the base of the keyboard unit being sized to fit within the keyboard support, the plurality of keys including a plurality of character keys being disposed in a central portion of the base and a plurality of function keys being disposed in a peripheral portion of the base outward the central portion; and
a plurality of detecting elements positioned on the base and each facing an underside of the key top, each of the plurality of detecting elements being a water immersion detection sheet that is formed to change appearance upon contact with a liquid, wherein a number of water immersion detection sheets provided under the plurality of function keys is greater than a number of water immersion detection sheets provided under the plurality of character keys.

25. An electronic apparatus comprising:
a keyboard unit including a keyboard body having a base and a plurality of keys each having a key top; and
a plurality of detecting elements positioned on the base and each facing an underside of the key top, each of the plurality of detecting elements being a water immersion detection sheet that is formed to change appearance upon contact with a liquid, wherein a number of water immersion detection sheets provided under the plurality of function keys is greater than a number of water immersion detection sheets provided under the plurality of character keys.

* * * * *